United States Patent [19]
Kimbrough

[11] 4,091,746
[45] May 30, 1978

[54] ARTICLE OF FURNITURE

[76] Inventor: James Alvin Kimbrough, SW. 135 State St., Apt. 2, Pullman, Wash. 99163

[21] Appl. No.: 733,080

[22] Filed: Oct. 18, 1976

[51] Int. Cl.² .............................................. A47B 3/06
[52] U.S. Cl. .................................. 108/153; 297/440; 108/101; 46/25
[58] Field of Search ............... 108/153, 150, 101, 64; 52/591, 594, 753 T, 753 R; 46/25; 297/440, 118

[56] References Cited

U.S. PATENT DOCUMENTS

| 3,139,698 | 7/1964 | Arnold | 46/25 |
| 3,148,477 | 9/1964 | Björn et al. | 46/25 |
| 3,389,493 | 6/1968 | Zysset | 46/25 |
| 3,464,211 | 9/1969 | Andresen | 52/753 X |
| 3,612,289 | 10/1971 | Zink | 52/753 X |

FOREIGN PATENT DOCUMENTS

| 217,252 | 9/1958 | Australia | 46/25 |
| 504,323 | 8/1930 | Germany | 403/381 |

Primary Examiner—Roy D. Frazier
Assistant Examiner—Peter A. Aschenbrenner
Attorney, Agent, or Firm—Wells, St. John & Roberts

[57] ABSTRACT

A plurality of components that may be assembled to form a complete furniture article. The components include two basic forms of joints, the tongue and groove and dovetail joints which enable the individual components to be merely pressed together to form the complete furniture article. The interfitted dovetail elements are locked in place by the provision of the tongue and groove joints on opposite sides of the dovetail elements. The assembled furniture article is designed such that the dovetail joints are "blind" or not visible from the finished furniture article.

5 Claims, 4 Drawing Figures

ARTICLE OF FURNITURE

BACKGROUND OF THE INVENTION

The present invention is related to component parts that are adapted to be assembled by a purchaser to form a complete furniture article.

The rising cost of labor in manufacturing has made the purchase of new furniture difficult for average and low income persons. Therefore, it has become desirable to provide some forms of furniture that enable the purchaser to perform some of the manual tasks that would ordinarily be performed prior to the selling of the article. An example of this may be found in the market for unfinished furniture. Such furniture may be sold at a substantially lower cost than finished furniture since the buyer becomes responsible for the materials and labor necessary to finish the article. Some manufacturers have taken the labor saving step further and have provided furniture that is not only unfinished, but is also unassembled. In this instance, the purchaser may save even more of the initial cost that would have been allocated to labor for assembly of the furniture article. Unfortunately, a majority of these "kits" require that the purchaser have access to relatively expensive shop tools to complete the assembly. Thus, the savings in labor is often more than offset by the cost of the tools required for assembly. It therefore becomes desirable to provide a furniture article in kit form wherein the ultimate purchaser is not required to obtain any tools to assemble the component parts and further to provide such component parts that may be assembled without the use of hand or power tools.

It is therefore a primary object of the present invention to provide a furniture article that may be assembled and finished by the purchaser without requiring the use of expensive tools.

A further object is to provide such a component kit wherein the assembled piece of furniture is of sturdy construction.

A still further object is to provide such a furniture article that may be produced in alternate configurations that may be assembled to form various forms of furniture articles.

These and still further objects and advantages will become apparent upon reading the following description which, taken with the accompanying drawings, disclose a preferred form of my invention. However, the following description and drawings are not to be taken as restrictive upon the scope of my invention. Only the claims found at the end of this specification may be taken as specific limitations upon the scope of my invention.

DETAILED DESCRIPTION OF A PREFERRED EMBODIMENT

Figure 1:
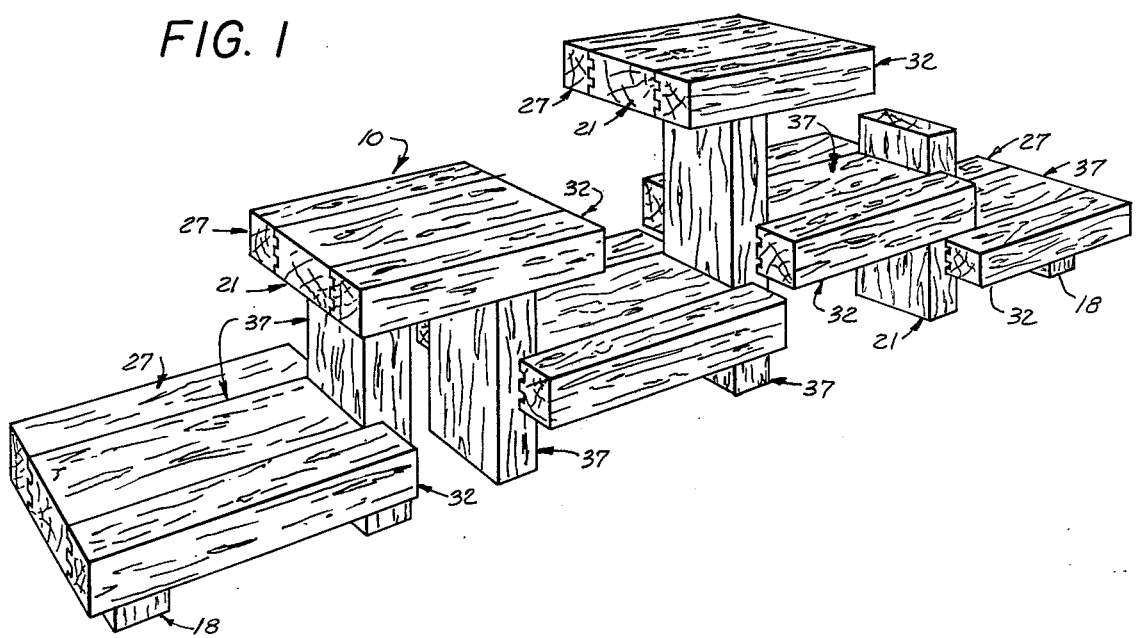
FIG. 1 is a pictorial view of an assembled furniture article utilizing the components of the present invention.

The present invention is composed of a series of component parts that interfit to enable construction of a furniture article such as the staggered shelf display generally designated at 10 in FIG. 1. It is intended that the present components be manufactured in different lengths and joint arrangements such that different furniture articles may be produced and sold in component kits. Such kits, however, would include the same basic component characteristics as disclosed herein and particularly defined in the claims following this description.

Looking at the individual components in greater detail, reference will be made in particular to FIGS. 2 through 4. A first elongated frame component is designated at 17. The first basic component 17 includes at least one male dovetail joint element 18 that extends across its entire width between longitudinal side edges 20 and 20a. The width dimension is designated in FIG. 2 by the dimension line 19.

A second elongated frame component is illustrated at 21. It includes at least one female dovetail element 22. Component 21 also includes opposed longitudinal side edges 24a and 25a. The male dovetail elements 18 and female elements 22 are formed within the respective components such that the resulting angular relation of the interfitted components (when the joint is complete) is perpendicular. The interfitting relationship between the male and female elements 18 and 22 is illustrated in FIG. 3. It should be noted that the width between edges 24a and 25a (shown by dimension line 26) of the female dovetail element is equal to the width dimension 19 of the male member. Therefore, a flush fit is realized between the complementary component members.

Depending upon the particular furniture configuration, one or both of the first two basic components 17 and 21 will be provided with integral tongue elements 24 extending along one side edge 20 or 24a and groove elements 25 extending along an opposite side edge 20a or 25a. The width dimension 26, should the tongue and groove elements be provided on the second basic component 21, (FIG. 2), is that dimension between the bases of the tongue and groove elements 24 and 25. This dimension, as explained above, is equal to the width dimension 19 of the male dovetail joint element 18.

Figure 2:
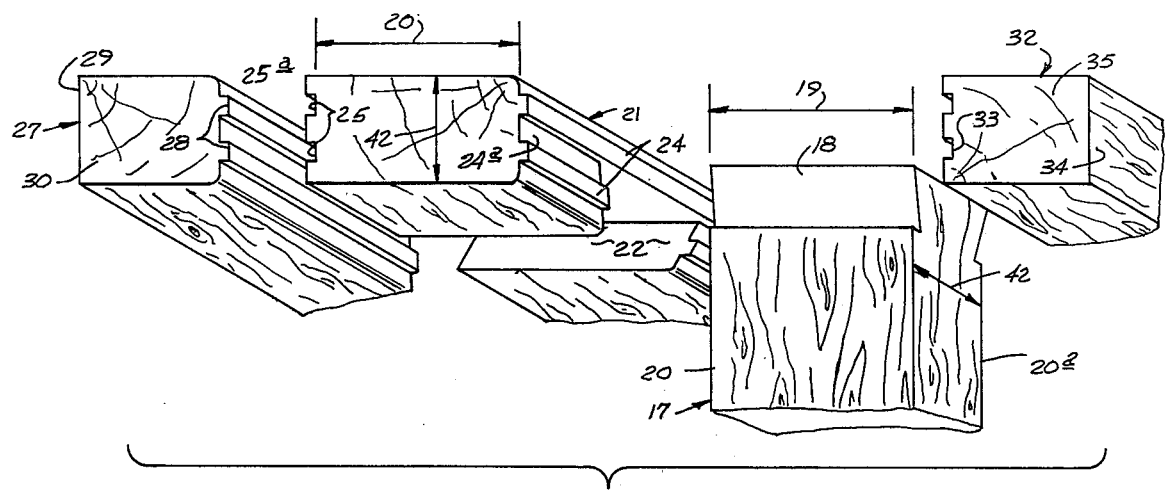
FIG. 2 is an exploded pictorial view illustrating fragments of components of the present invention.
Figure 3:
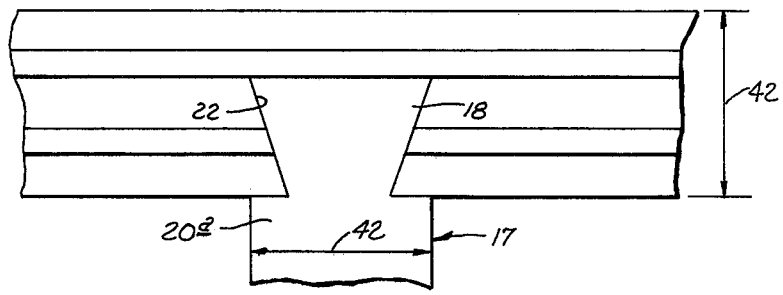
FIG. 3 is a fragmentary elevational view illustrating the dovetail joint of the present invention.
Figure 4:
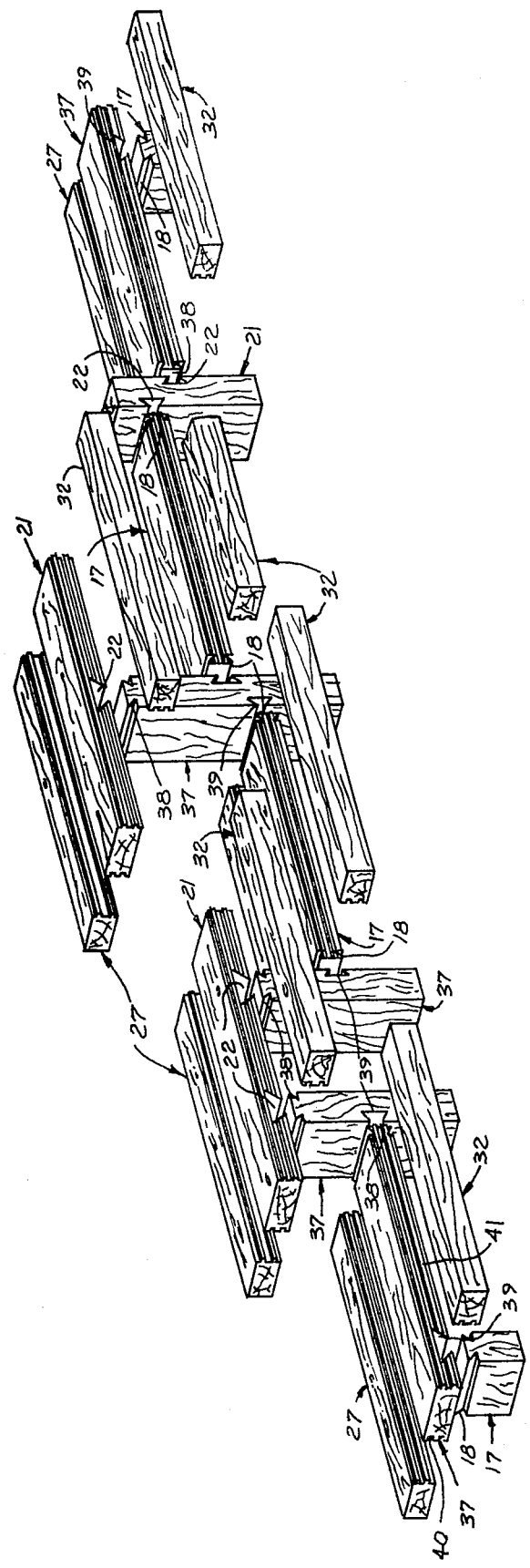
FIG. 4 is an exploded pictorial view showing the article of FIG. 1 in a disassembled condition.

A shelf component element 27 is illustrated particularly by FIGS. 2 and 4. Component 27 includes tongue elements 28 extending along its length that are adapted to interfit with the groove elements of a complementary component. The tongue elements 28 are opposite a smooth longitudinal side 29. Also, they extend longitudinally between smooth opposed ends 30.

A second shelf component 32 is also shown in substantial detail by FIG. 2. It includes longitudinal integral grooves 33 that extend along its length. Grooves 33 are adapted to receive the tongue elements of another component. The grooves 33 are opposite a smooth longitudinal side 34 that extends the full length of the component 32 between opposed smooth ends 35.

The four components described above are all required (in varying numbers) to make a wide variety of basic furniture articles. All kits will include these basic components. The four components as shown in FIG. 2 may be arranged to form different articles such as tables, stools, chairs, etc., depending upon the specific arrangement of the joining elements along the lengths of the components. In the example shown in FIG. 2, the tongue and groove elements 24 and 25 are located on the second basic component 21. This is not essential, however, since the components may be manufactured with the groove and tongue elements as an integral part of the first basic component 17. An example of such an arrangement may be found in FIG. 4. Therefore, it becomes apparent that the relationship of the tongue and groove elements to the dovetail elements may vary from component to component according to design considerations.

In addition to the four basic components disclosed above, there may be provided a third frame component as shown at 37 in FIG. 4. Component 37 is very similar to the other frame components, the distinction being that it includes both a male dovetail element 38 and a female dovetail element 39. It may or may not include grooves 40 and tongues 41. The component 37 that is utilized as an upright support in FIG. 4 does not make use of grooves or tongues. However, the horizontal component 37 that is provided to interconnect with the female dovetail member 39 of the upright component does include grooves 40 and tongues 41 to enable construction of an enlarged shelf area through engagement with the shelf components 27 and 32.

The dovetail and tongue and groove elements are identical to the corresponding elements of components 18 and 21. Thus, a female element 22 may receive a male element 38 and grooves 40 may receive tongue 28.

The component 37 is not essential to the basic arrangement for all construction and forms of furniture articles. However, it is necessary to produce the structure shown in FIG. 1 and other more complex articles. Through its provision, the entire unit becomes an integral, interconnected article. Component 37 may also find uses in other forms of furniture of a more complex nature than shown herein.

It should be noted that all the components are rectangular and identical in thickness dimension (between planar side surfaces) regardless of the intended use. The common thickness dimension is indicated by the dimension line 42 in FIGS. 2 and 3. This uniformity facilitates the simplicity of construction and further adds continuity to the furniture appearance. Further, the lengths of longitudinally interfitting components, such as those making up the horizontal shelves of FIG. 1, are equal. Through this provision, the interlocking dovetail joint elements are hidden from view by the adjacent ends of the shelf components 27 and 32.

In assembling the elements shown in FIG. 2, one first places the component 27 or 32 on a flat surface with the associated tongue or groove elements facing upwardly. One then secures the second component 21 to that component by interconnecting the complementary tongue and groove joint elements. In doing so, one side of the female dovetail element 22 is closed. The next step is to interconnect the first element with the second element. This is done by slidably engaging the male dovetail joint element 18 within the female element 22. The component 27 or 32 already attached to the second component 22 prevents sliding movement of the male dovetail element outwardly of the female element 22 by blocking its passage. Finally, the remaining element 32 or 27 is pressed onto the second component 21 such that the tongue and groove elements thereof interfit closely. This step serves to substantially lock the first component 17 in perpendicular relation to the second, third and fourth components.

The above steps may be performed with the four basic components described above to form a variety of different furniture articles depending on the kit design. The type of furniture article formed is determined only by the dimensions of the components and the locations of the interfitting joint elements.

Construction involving use of the frame component 37 may be explained with reference to FIG. 4. Such a component is utilized in the formation of that portion of the shelving 10 that is shown in the lower left hand corner of the drawing. For the purpose of brevity, construction of only that portion will be described.

As with the four component construction described above, one of the end components 27 or 32 is first laid on a flat surface with the joint elements (grooves or tongues) thereof facing upwardly. The second step is also similar except that the component 37 is placed in engagement with the complementary joint element of the previously placed component 27 or 32. Thus, in this situation the center component will have both a male joint element 38 and a female joint element 39. After placing this component in connection with the associated component 27 or 32, two other components may be connected thereto. In the illustrated construction, a first component 17 is attached by fitting the male joint element 18 into engagement with the female dovetail element 39 of the fifth component. A second component 37 is then utilized with its female dovetail element 39 interlocking with the male dovetail element 38 of the first described component 37.

The four interconnected components are then locked into their engaged positions by placing the shelf component 27 or 32 into engagement with the tongue or grooves of the appropriate component 37. The final product is an integral unit as shown toward the left hand end of the shelves 10 of FIG. 1. Construction of the remaining shelving follows a similar pattern.

When viewed from a slightly different perspective, the basic configuration includes at least two uprights and an interlocking horizontal shelf. The two uprights are selected from the basic frame components 17, 21 and 37. Horizontal shelf includes one of the basic frame components 17, 21 or 37 and both shelf components 27 and 32. The basic frame component 17, 21 or 37 which forms part of the horizontal shelf has longitudinal tongue and groove joint elements. The joint elements interlock the uprights with the horizontal shelf. The joint elements are hidden by the overlapping of the components 27 and 32.

It is presently contemplated that other forms of the structure shown in FIG. 1 may be provided through different design techniques. In addition, it is also contemplated that minor changes and modifications of the individual component parts may be made without departing from the scope of my invention. Therefore, I intend that only the following claims are to be taken as restrictions upon the scope of my invention.

What I claim is:

1. An article of furniture, comprising:
    three elongated frame components, each having rectangular cross sections with face side surfaces and edge side surfaces extending between ends and with equal widths between edge side surfaces and equal thicknesses between face side surfaces;
    dovetail joint means interlocking said frame components together to form two spaced supporting uprights and an interconnecting horizontal shelf;

wherein the dovetail joint means include: (1) male dovetail joint elements formed on two or more ends of the elongated frame components, and complementary female dovetail joint elements recessed in one or more side surfaces of the elongated frame components;

wherein the elongated frame component forming the horizontal shelf has integral longitudinal tongue and groove joint elements projecting outward from respective edge side surfaces along the length of the one elongated furniture component;

two elongated shelf components having rectangular cross section with face side surfaces and edge side surfaces extending between ends and having thicknessess between face side surfaces equal to the thicknesses of the elongated frame components;

wherein each of the shelf components has a longitudinal tongue and groove joint element along one edge side surface thereof interfitting with a corresponding tongue and groove joint element of the one frame component to enable the elongated shelf components to be securely attached to opposite edge side surfaces of the one frame component and overlap and hide the interlocking male and female dovetail joint elements to prevent the male and female dovetail joint elements from being unintentionally disjoined and to provide an extended horizontal shelf beyond the width of the one elongated frame component;

wherein the elongated frame component forming the horizontal shelf and each of the shelf components have a face side surface that is smooth and forms a flush extended shelf surface.

2. The furniture article as defined in claim 1 wherein the dovetail joint means includes a male dovetail joint element formed on one end of the upright frame component and a complementary female dovetail joint element formed in one side surface of the horizontal frame component to interlock the one upright frame component to the horizontal frame component.

3. The furniture article as defined in claim 2 wherein dovetail joint means further includes a male dovetail joint element formed on one end of the other upright frame component and a complementary female dovetail joint element formed in the one side side surface of the horizontal frame component to interlock the other upright frame component to the horizontal frame component.

4. The furniture article as defined in claim 2 wherein the dovetail joint means further includes a male dovetail joint element formed on one end of the horizontal frame component and a complementary female dovetail joint element formed in one side surface of the other upright frame component to interlock the horizontal frame component to the other upright frame component.

5. The furniture article as defined in claim 1 wherein the dovetail joint means includes male dovetail joint elements formed on opposite ends of the horizontal frame component and complementary female dovetail joint elements formed in side surfaces of the upright frame components to interlock the horizontal frame component with the upright frame components.

* * * * *